United States Patent [19]

Neth et al.

[11] 4,063,632

[45] Dec. 20, 1977

[54] SWINGABLE ARCUATE GUIDE FOR SELECTIVELY ORIENTING ARTICLES

[75] Inventors: Otto Neth; Robert A. Schmitt, both of Vancouver, Wash.

[73] Assignee: Columbia Machine, Inc., Vancouver, Wash.

[21] Appl. No.: 699,200

[22] Filed: June 23, 1976

[51] Int. Cl.² .................................................. B65G 47/24
[52] U.S. Cl. ........................................ 198/374; 198/633
[58] Field of Search ............... 198/374, 411, 412, 415, 198/416, 457, 636, 367, 395, 398–400, 633, 787, 780; 214/6 P, 6 A

[56] References Cited

U.S. PATENT DOCUMENTS

| | | | |
|---|---|---|---|
| 2,664,816 | 1/1954 | Gibson | 198/416 |
| 2,703,182 | 3/1955 | Broberg et al. | 198/374 |
| 3,236,360 | 2/1966 | Winter | 198/367 |
| 3,592,328 | 7/1971 | Sapp | 198/374 |
| 3,700,127 | 10/1972 | Kurk et al. | 198/374 |

*Primary Examiner*—John J. Love
*Assistant Examiner*—Joseph E. Valenza
*Attorney, Agent, or Firm*—Kolisch, Hartwell, Dickinson & Stuart

[57] ABSTRACT

Article orienting apparatus including a first, or infeed, conveyor, a second, or outfeed, conveyor and an arcuate guide member swingable between a first article engaging position and a second non-article engaging position for selectively orienting predetermined sides of an article to face in the downstream direction of travel of the second conveyor after the article has been transferred thereto from said first conveyor. An extendible-retractable ram selectively actuates an alignment roller for contacting an incompletely turned article for substantially completing a turning sequence when said arcuate guide member is disposed in said first article engaging position.

5 Claims, 4 Drawing Figures

SWINGABLE ARCUATE GUIDE FOR SELECTIVELY ORIENTING ARTICLES

BACKGROUND OF THE INVENTION

1. Field of the Invention

The present invention relates to conveying apparatus, and more particularly to a novel conveying system operable to selectively turn articles transferred from a first conveyor to a second conveyor for selectively orienting predetermined article sides to face in the downstream direction of travel of the second conveyor.

In various manufacturing or packaging operations, it is often the case that articles such as cartons or boxes travel down a conveyor to an end station where they are either manually or automatically stacked on a pallet or the like for subsequent transfer. In the case of rectangular cartons, such cartons are typically stacked in layers, each layer comprising a plurality of cartons. In order to provide some support between the layers, the cartons may be stacked so that the cartons in adjacent layers overlap. Such overlapping serves to intertie the layers and prevents the cartons from tipping over when a stack is moved. In conveying systems, it is typical that rectangular cartons travel down a conveyor such that only one side of a carton is presented at the downstream end. As a consequence, individuals stacking the cartons must physically turn the cartons in order to alternately stack them in the aforementioned intertied stacking arrangement. If the boxes are large and heavy, such alternate turning by individuals is burdensome as well as time consuming.

It can be readily appreciated that it is desirable to provide a conveying system which would selectively orient the sides of an article so that selected sides of articles would be alternately presented to face the end of a conveyor. If selected sides were presented, the boxes would not have to be turned in order to coincide with a stacking pattern. The present invention is directed toward providing a conveying system which selectively turns articles transferred from a first conveyor to a second conveyor so that predetermined sides of an article are presented at the downstream end of the second conveyor. To accomplish such turning, the present invention utilizes a novel arcuate guide member for selectively engaging articles to turn articles along an arcuate path defined by the arcuate guide member.

2. Description of the Prior Art

Various systems and devices have been heretofore proposed to turn articles traveling down a conveyor. However, these systems do not provide for presenting alternate sides of a box or article at the end of a conveyor. For instance, in U.S. Pat. No. 3,834,517 there is disclosed a high-speed container orienting mechanism which is used to re-orient elongate cylindrical containers. Specifically, this patent discloses a system in which containers traveling in the direction of their longitudinal axes are rearranged so that the containers are positioned one next to another with their longitudinal axes parallel to one another. Initially, the containers are delivered with their longitudinal axes in line onto an endless conveyor belt whereupon the containers contact an arcuate guide for travel therealong on the endless belt. The containers are re-oriented onto a receiving conveyor in single file upright position with their longitudinal axes parallel to each other. It is to be noted that the mechanism does not provide selective turning of the containers so that a predetermined container side faces downstream in the receiving conveyor.

Another prior art conveyor including an arcuate turning mechanism is described in U.S. Pat. No. 3,182,783. Here, a bale conveying apparatus is disclosed which transfers a bale from a first conveyor to a second conveyor disposed at right angles thereto by providing an arcuate guide rail for turning a bale so that the same side of consecutive bales always face in the downstream direction of travel on the second conveyor. It is readily apparent from a consideration of this patent that there is no provision for selectively turning a bale so that preselected alternate sides of consecutive bales face downstream in the direction of travel of the second conveyor.

SUMMARY OF THE INVENTION

It is a general object of the present invention to provide apparatus which transfers articles from an infeed conveyor to an outfeed conveyor such that a predetermined side of an article is oriented to face downstream in the direction of travel of the outfeed conveyor. Accordingly, the present invention contemplates a construction in which a first article infeed supporting and conveying means is disposed generally at right angles to a second article outfeed supporting and conveying means wherein an elongate, arcuate guide member is arranged to selectively engage articles transferred from the first conveying means to turn the articles on the second conveying means. Alternatively, the elongate, arcuate guide member is positionable so that it will not turn articles transferred from the first conveying means so that the articles will travel in a direction perpendicular to the first conveying means without being turned.

It is another object of the present invention to provide an elongate, arcuate guide member which is pivotally mounted adjacent the conveyors and arranged so that it will swing laterally above the conveyors between a first article-engaging position and a second non-article-engaging position.

Yet another object of the present invention is to provide an article-orienting apparatus in which the pivotally-connected elongate guide member is arranged to provide an arcuate extension from a guide member on the first conveying means to ensure continuous turning of an article from the first conveying means to the second conveying means when the elongate member is disposed in the first article-engaging position.

Yet another object of the present invention is to provide an article-orienting apparatus in which speed-up rollers are provided at the downstream end of the first conveying means for propelling articles into the arcuate guide member when it is disposed in the first article-engaging position to ensure that the articles continuously contact the guide member during turning.

Still another object of the present invention is to provide a selectively extendible-retractable alignment roller disposed between a pair of adjacent, laterally-spaced second conveying means rollers for contacting the side of an incompletely turned article so that the article will be substantially turned 90° for travel downstream on the second conveying means. Additionally, when the elongate, arcuate guide member is disposed in the non-article engaging position so that an article will be transferred from the first conveying means to the second conveying means without being turned, the alignment roller is operatively disposed beneath the upper conveying surfaces of the laterally-spaced second conveying means rollers.

Additional objects of the present invention reside in the specific construction of the exemplary apparatus hereinafter particularly described in the several drawings.

BRIEF DESCRIPTION OF THE DRAWINGS

Novel features of the article orienting apparatus in accordance with the present invention will be more readily understood from a consideration of the following description, taken together with the accompanying drawings, in which a preferred embodiment is illustrated with the various parts thereof identified by suitable reference characters in each of the views, and in which.

DETAILED DESCRIPTION OF THE INVENTION

Figure 1:
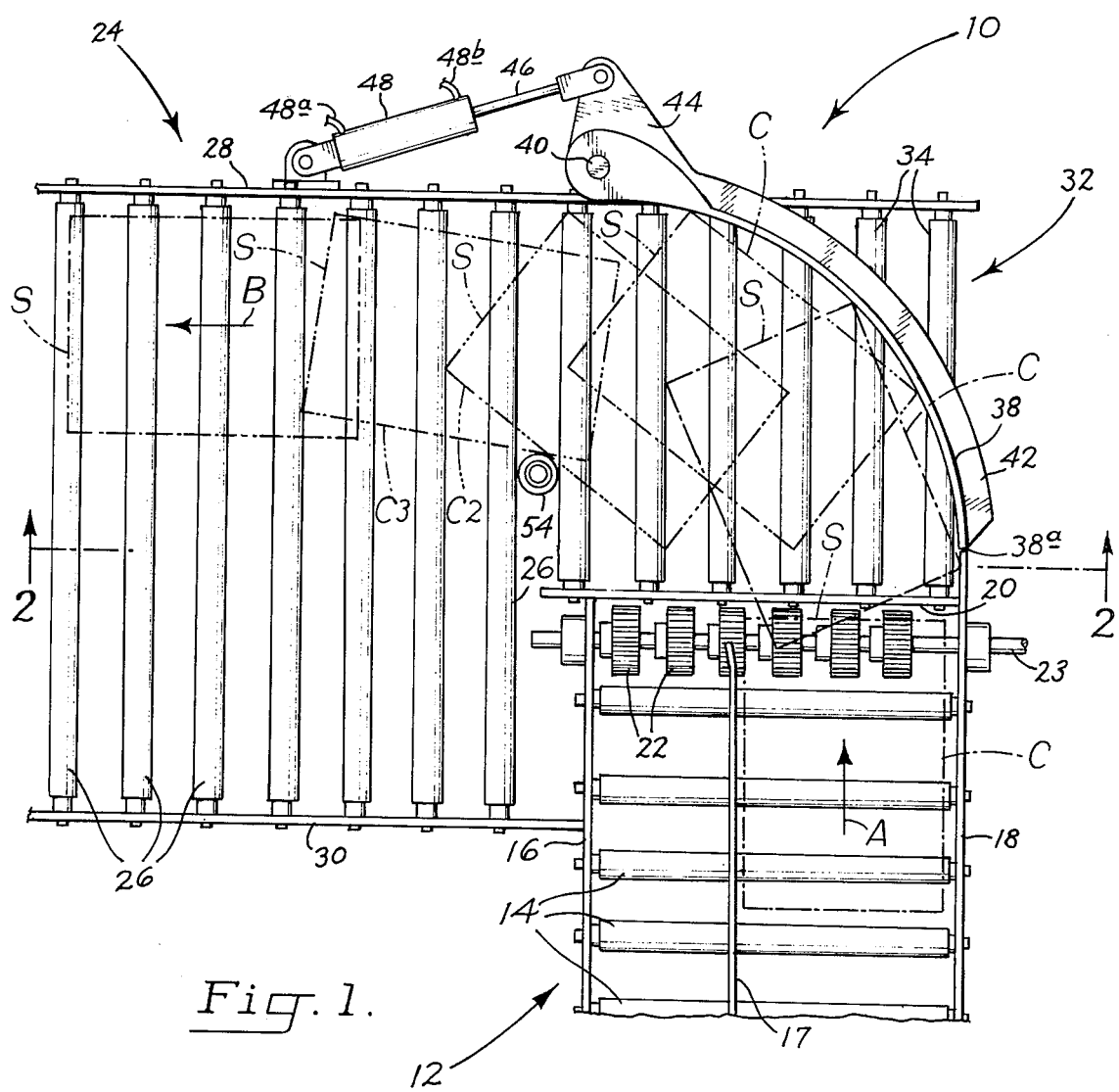
FIG. 1 is a top plan view of the article orienting apparatus showing portions of first and second conveyors arranged generally perpendicular to each other with the elongate, arcuate guide member shown in article-engaging position.
Figure 2:
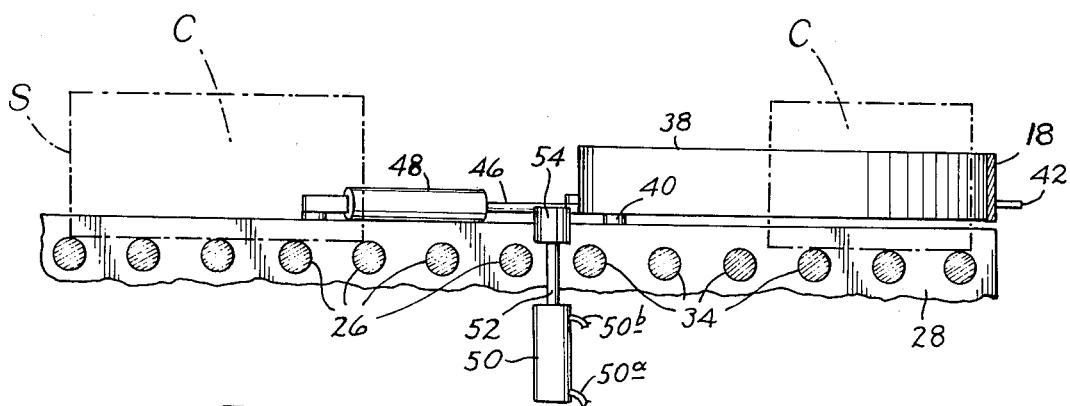
FIG. 2 is a side elevational view taken along lines 2—2 of FIG. 1 and shows the alignment roller in extended position.

Turning now to the drawings, and referring initially to FIG. 1, at 10 is indicated generally an article conveying and positioning apparatus in accordance with the present invention. The apparatus 10 includes a first, infeed conveyor means 12 for supporting and conveying articles which comprises a plurality of elongate, laterally-spaced, power-driven rollers 14. Only a downstream end portion of a length of the first conveyor means 12 is illustrated. The rollers 14 are journaled at their respective ends in supporting frame members 16 and 18. It is to be remembered that FIG. 1 is a plan view, and the apparatus 10 is disposed substantially horizontally as shown in FIG. 2 above a floor surface.

A cross-frame member 20 is provided at the downstream end of the conveyor means 12 and serves to secure together at one end the frame members 16, 18. A plurality of spaced-apart, speed-up rollers 22 are concentrically secured to a power-driven shaft 23. The shaft 23 is journaled within the frame members 16, 18 and is driven at a speed faster than the power-driven rollers 14. Additionally, the rollers 22 are constructed of a somewhat yieldable material having segmented surfaces 22a in order to provide a relatively non-slip surface between the surfaces of the rollers 22 and an article.

Disposed generally perpendicularly to the first conveyor means 12 is a second, outfeed conveyor means 24 for supporting and conveying articles which includes a plurality of elongate, laterally-spaced, power-driven rollers 26 journaled in frame members 28 and 30. Additionally, the second conveyor means 24 includes a transfer zone 32, which comprises a plurality of shorter, elongate power-driven rollers 34 journaled in the frame members 20, 28. The transfer zone 32 extends into the path of the first conveyor means 12. Only a portion of the length of the second conveyor means 24 is illustrated.

An orienting means which includes an elongate, arcuate guide member 38 is pivotally mounted at 40 adjacent to the second conveyor means 24. A stiffening member 42 is secured to a back side of the guide member 38 to provide rigidity. A link 44 extends outwardly from the stiffening member 42 to provide a connection to a vertically extendible-retractable rod 46. The rod 46 is actuated by a fluid-operated, ram 48 which is mounted adjacent to the frame member 28. The fluid-operated ram 48 is provided with suitable fluid introduction and discharge conduits 48a, 48b connected to an appropriate source (not shown) for supplying and exhausting pressurized actuating fluid.

As can be seen from a consideration of FIG. 2, an alignment means which includes an additional fluid-operated, ram 50 is disposed in upright position between a pair of adjacent, power-driven rollers 26, 34 and further includes a vertically extendible-retractable rod 52. The rod 52 has a roller 54 connected thereto. Appropriate fluid introduction and discharge conduits 50a, 50b are provided to connect the fluid-operated ram 50 to an appropriate source of fluid power (not shown). The fluid-operated ram 50 is mounted to a supporting frame structure (not shown).

OPERATION OF THE ORIENTING APPARATUS

The operation of the conveying and positioning apparatus 10 of the present invention will now be described. Referring to FIGS. 1 and 2, the apparatus 10 is shown with the arcuate guide member 38 disposed in a first, or article-engaging, position. The fluid-operated ram 48 is actuated to swing guide member 38 from a second, non-article-engaging position (see FIG. 3) to the position shown in FIG. 1 so that an end 38a of the member 38 is disposed adjacent to an end of the frame member 18. The guide member 38 swings in a plane above and substantially parallel to a plane defined by the upper surfaces of the rollers 14, 26 and 34. As an article, such as a box or carton C shown in dot-dash, travels in the direction of arrow A, the article C is given added momentum by the speed-up rollers 22 so as to be transferred and propelled from conveyor means 12 into the member 38. Article C contacts the guide member 38 and is sequentially turned while traveling therealong. If the box C is sufficiently propelled by the speed-up rollers 22, it will follow along the arcuate member 38 so that a side S, originally facing in the direction of arrow A, will be turned approximately 90° in the transfer zone 32 to face in the downstream direction of travel of the second conveyor means 24. Such direction is indicated by the arrow B.

However, if the boxes are particularly heavy, the speed-up rollers 22 may not provide sufficient momentum to propel the article C around the arcuate guide member 38. In such a circumstance, the article may be conveyed in the direction B before the side S is oriented to face such direction. To correct such an occurrence, the ram 50 is operated to vertically extend the rod 52 and the roller 54. Thus, if an article, such as that indicated by C2 is incompletely turned, the article C2 will contact the roller 54 and move therealong to be respositioned so that side S is aligned in the direction of arrow B. The roller 54 facilitates turning movement of an article thereby. As shown in FIG. 1, the article C3 has been almost completely turned by the roller 54.

Figure 3:
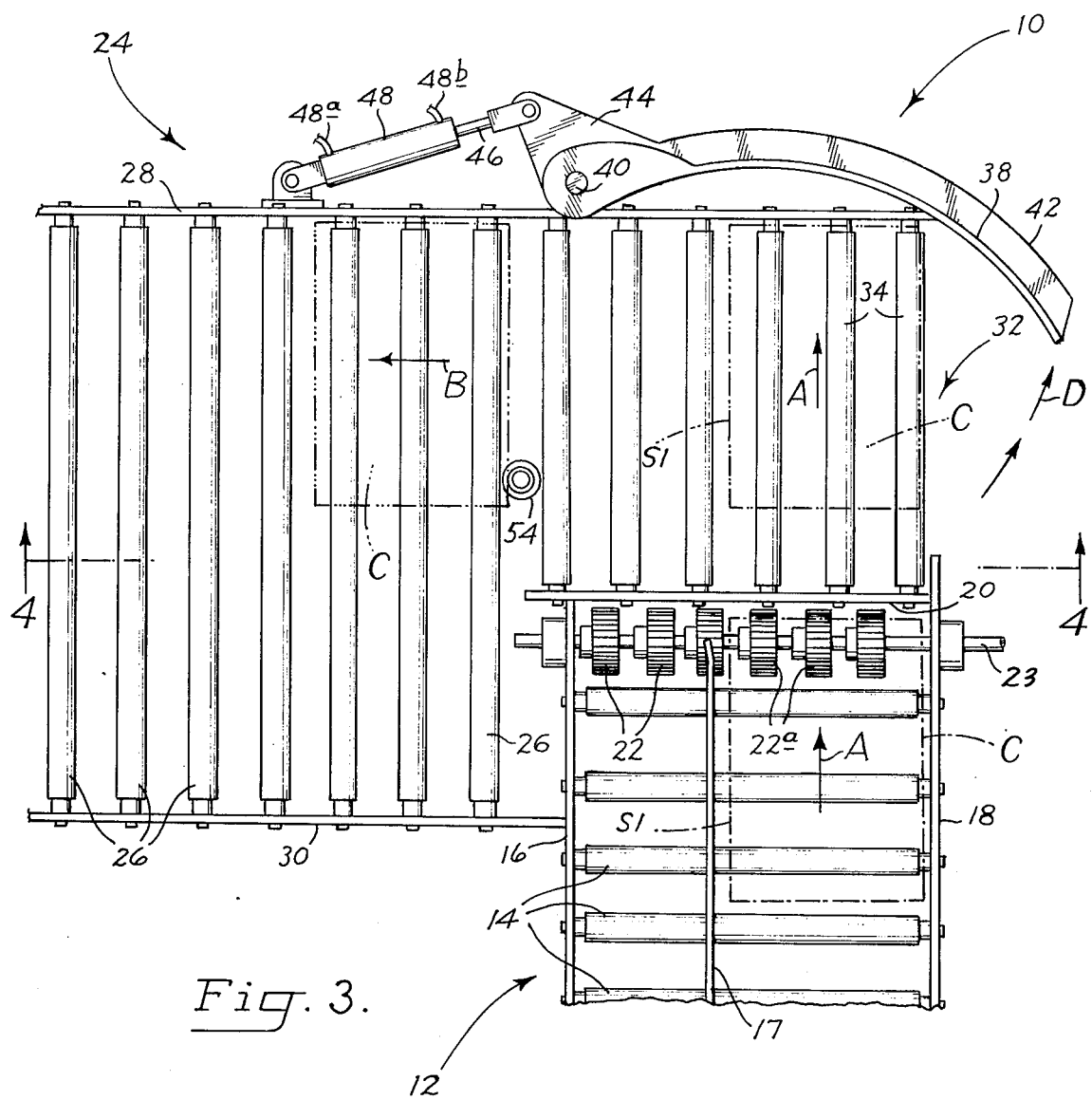
FIG. 3 is a top plan view similar to FIG. 1 but illustrating the inoperative position of the elongate, arcuate guide member in non-article engaging position.
Figure 4:
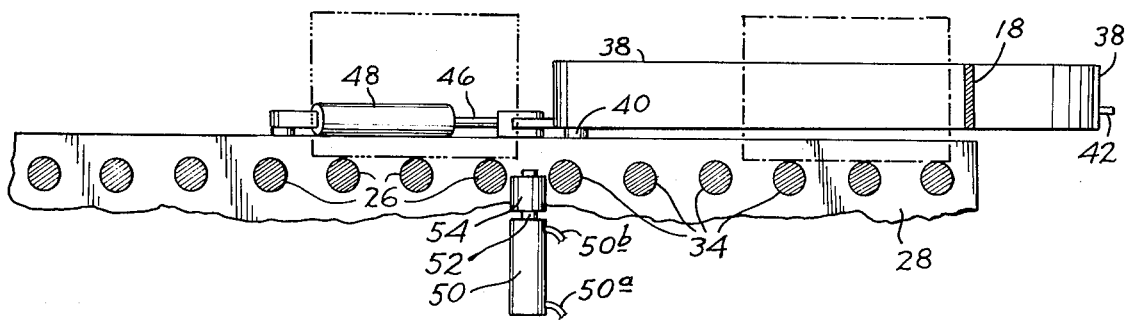
FIG. 4 is a side elevational view taken along lines 4—4 of FIG. 3 and shows the guide roller in contracted position so that it will not interfere with articles traveling down the second conveyor.

With reference now directed to FIGS. 3 and 4, it can be seen how a predetermined side S1 of an article can be oriented so as to face in the direction of arrow B after transfer from the first conveyor means 12. The ram 48 is actuated to swing the guide member 38 in the direction of arrow D to the second, non-article engaging position. Thus, when the article C travels in the direction of arrow A, it will be propelled by the speed-up rollers 22 onto the rollers 34 of the transfer zone 32. The article C will not be turned, but rather will be conveyed by the second conveying means 24 in the direction of arrow B with side S1 facing downstream toward such direction. As shown in FIG. 4, it is to be noted that when the guide member 38 is selectively swung to the second non-article engaging position as shown in FIG. 3, the ram 50 is also retracted to displace the roller 54 beneath the supporting surfaces of the conveying rollers 26, 34 so that interference with the article C will not occur.

The fluid-operated, extendible-retractable rams 48, 50 may be selectively actuated in order to provide for alternate or desired sequencing of sides S and S1 to face in the direction of arrow B. As a consequence, predetermined sides of articles may be selectively and automatically presented at the end of a conveying system in a desired sequence so that an individual does not have to turn the articles manually. Stacking of articles is thereby greatly facilitated.

While the invention has been particularly shown and described with reference to the foregoing preferred embodiment thereof, it will be understood by those skilled in the art that other changes in form and detail may be made therein without departing from the spirit and scope of the invention as defined in the appended claims.

What is claimed is:

1. Apparatus for orienting articles comprising
first conveyor means operable for supporting and conveying articles in a first direction,
second conveyor means disposed at least partially in the path of said first conveyor means operable for supporting and conveying articles in a second direction generally perpendicular to said first direction, said second conveyor means arranged to receive articles transferred from said first conveyor means, and
article orienting means disposed adjacent said first and second conveyor means including an elongate, arcuate guide member disposed in a plane generally parallel to and above a plane occupied by said second conveyor means with one end thereof pivotally mounted adjacent said second conveyor means, said arcuate guide member being swingable across a portion of said second conveyor means and operable for selective positioning between a first, article engaging position for permitting a transferred article to engage said arcuate guide member and travel in an arcuate path therealong until a side which initially faced downstream in said first direction is turned to face at least partially downstream in said second direction and a second, non-article-engaging position for permitting a transferred article to move in said second direction unturned relative to said first direction, said arcuate guide member also having a length dimensioned to permit an end opposite said pivotally mounted end to extend across at least a portion of the width of said second conveyor means to a location adjacent the end of said first conveyor means when said arcuate guide member is disposed in said first-article engaging position.

2. The apparatus of claim 1 wherein a plurality of concentrically arranged speed-up rollers are arranged at the downstream forward end of said first conveyor means, said speed-up rollers being operable to conveyor articles at a higher rate of speed than said first conveyor means to propel articles from said first conveyor means onto said second conveyor means.

3. The apparatus of claim 1, which further comprises selectively operable, article engaging alignment means disposed adjacent said second conveyor means for contacting an incompletely turned article and turning such article to align the side initially facing downstream in said first direction generally perpendicular to the downstream direction of travel of said second conveyor means.

4. The apparatus of claim 3 wherein said second conveyor means includes a plurality of substantially parallel, laterally-spaced elongate rollers, and said alignment means includes a vertically extendible-retractable member disposed between a pair of said rollers selectively operable for extending between a position above the upper surface of the rollers for contacting an incompletely turned article and a position below said upper surfaces.

5. The apparatus of claim 4 wherein said alignment means further includes roller means mounted on said extendible-retractable member for facilitating passage of an article thereby.

* * * * *

UNITED STATES PATENT AND TRADEMARK OFFICE
CERTIFICATE OF CORRECTION

PATENT NO. : 4,063,632

DATED : December 20, 1977

INVENTOR(S) : Otto Neth; Robert A. Schmitt

It is certified that error appears in the above-identified patent and that said Letters Patent are hereby corrected as shown below:

Column 6, line 24, "conveyor" should be —convey—.

Signed and Sealed this

Thirteenth Day of June 1978

[SEAL]

Attest:

RUTH C. MASON
Attesting Officer

DONALD W. BANNER
Commissioner of Patents and Trademarks